July 28, 1959 W. M. BACON ET AL 2,897,268

CIPHER TELEGRAPH SYSTEM

Filed May 5, 1954 3 Sheets-Sheet 1

INVENTORS W. M. BACON
B. OSTENDORF, JR.
BY R. C. Perry
ATTORNEY

July 28, 1959 W. M. BACON ET AL 2,897,268

CIPHER TELEGRAPH SYSTEM

Filed May 5, 1954 3 Sheets-Sheet 2

INVENTORS W. M. BACON
B. OSTENDORF, JR.
BY
R. C. Terry
ATTORNEY

INVENTORS W. M. BACON
B. OSTENDORF, JR.
BY R. C. Perry
ATTORNEY

United States Patent Office 2,897,268

Patented July 28, 1959

2,897,268

CIPHER TELEGRAPH SYSTEM

Walter M. Bacon, New York, N.Y., and Bernard Ostendorf, Jr., Stamford, Conn., assignors to Bell Telephone Laboratories, Incorporated, New York, N.Y., a corporation of New York Application May 5, 1954, Serial No. 427,692

12 Claims. (Cl. 178—22)

This invention relates to a private inter-communicating teletypewriter system having various types of lines, such as multistation lines, single station lines and trunks arranged to be interconnected through one or more switching centers, and more particularly to means and methods of handling enciphered messages transmitted over and recorded in such a system.

An object of the invention is to prevent during the transmission of the enciphered text of a message the transmission of a predetermined sequence of two predetermined signals, such as the sequence of signals corresponding to "Figures" and "H."

In systems of the above-mentioned type a combination of signals including those of "Figures H" is generally used as the end-of-message signal combination and serves to cause disconnections in the switching offices and on outgoing lines.

It is generally recognized that in enciphering arrangements used in teletypewriter systems for transmitting enciphered information any specific sequence of two code combinations, such as "Figures" and "H," in that order, will occur in the enciphered material on an average of once in every 1024 characters. Since "Figures H" is also used as an end-of-message signal combination in teletypewriter systems, the arrival over a line circuit at the switching office of this combination and its retransmission over outgoing circuits would result in the breaking down of connections already established at the switching office, to thereby prevent the transmission of the complete message to the ultimate receiving station.

In the enciphering of signals representing message material, the message sequence of signals is caused to interact with a key sequence of signals to produce an unintelligible sequence of signals and the latter are the signals that are transmitted. At the receiving point where the message material is to be rendered intelligible, the unintelligible sequence of signals is caused to interact with a duplicate of the above-mentioned key sequence of signals to derive the plain text or message sequence of signals.

Since the purpose in enciphering is to secure privacy, the enciphering usually takes place at the station of origin of the message and the deciphering takes place at the destination station. The message may be routed through one or more switching centers in order to reach its destination, and in an automatic switching system wherein the selective routing of message is under the control of address signals accompanying the message, those signals must not have been subjected to enciphering because they must be capable of controlling the selective switching apparatus. An alternative would be to transmit the address codes in enciphered condition along with the message signals, and this would necessitate deciphering the address codes at the switching center before the switching apparatus could be selectively controlled. Privacy would not be assured under these circumstances because the text of the message might also be deciphered. For the foregoing reasons, the end-of-message signals must also be transmitted without being subjected to the enciphering operation because they must control apparatus at the switching centers and at station control circuits to effect disconnect operations.

The occurrence, in the enciphered body of a message of code sequences corresponding to station address codes, does not give rise to troubles in the form of improper switching operations at switching points because, as in the case of unenciphered message transmission, the selective switching apparatus is rendered unresponsive, by a deactivating operation, to signals contained in the body of a message, and it is not reactivated until an end-of-message signal produces a disconnect operation.

Since an end-of-message signal comprising the signals for "Figures" and "H" can occur in the body of the message as a result of an enciphering operation, it is necessary to prevent the switching apparatus from interpreting such fortuitously occurring sequences of signals as a disconnect signal. In accordance with the present invention, this is accomplished by automatically modifying the "Figures H" sequence by the insertion of an intervening signal which will not introduce any error but which will convert the disconnect code sequence to a different sequence to which the disconnect mechanism will not be responsive.

According to the present invention a method and means are provided at a sending station for automatically introducing a "Letters" signal immediately following every "Figures" signal transmitted during the transmission of a message and other means are provided at the ultimate receiving station for removing this "Letters" signal so that such "Letters" signal is not recorded in the message at the ultimate receiving station. The recorded message will show the signal combination "Figures H" as it was originally transmitted from the sending station.

A feature of the invention is the method of and the provision of means for introducing the "Letters" signal immediately following the "Figures" signal in a transmitted message.

Another feature is the method of and the provision of means for deleting the "Letters" signal immediately following the "Figures" signal appearing in the text of the message arriving at the ultimate receiving station so that the recorded message at the ultimate receiving station is identical with that transmitted from the teletypewriter at the sending station.

The above and other objects and features of this invention are set forth in the following description and appended claims, and may be more readily understood and considered in conjunction with the accompanying drawings of which:

Figs. 1 and 2 show the invention adapted for use in a private intercommunicating teletypewriter system of the type disclosed in the application of Bacon-Knandel-Krecek-Locke Serial No. 119,184, filed October 1, 1949, which has issued as Patent No. 2,766,318 dated October 9, 1956, the system itself being mostly shown herein in schematic form. The disclosures of the Bacon et al. application, Serial No. 119,184, and the patents hereinafter referred to are hereby made parts of this application as if fully included herein;

Fig. 1 shows a sending station connected to a switching office, the switching office being shown in diagrammatic form, and Fig. 2 shows an ultimate receiving station which may be one of several receiving stations connected through a station control circuit to a multistation line circuit extending to the switching office shown in Fig. 1; and Fig. 3 is a series of wave shapes resulting from the consecutive "Figures" and "Letters" signals received at various parts of the ultimate receiving station circuit shown in Fig. 2.

In applying the present invention to the system disclosed in the Bacon et al. patent application, Serial No. 119,184, the sending station may be any one of those shown connected to the transmitting path of a full duplex line circuit shown in either Fig. 7 or 8 of the Bacon et al. patent application. For the purpose of describing the present invention it may be assumed that the transmitter distributor at the sending station in the present application corresponds to transmitter distributor 8–61 at sending station 8–07 in the Bacon et al. patent application, Serial No. 119,184. Transmitter distributor 8–61 is shown connected to the transmitting path of a multistation line circuit 8–01 which normally terminates in an incoming line circuit at the switching station shown in Fig. 5. A message, together with its switching signals and other routing information, is transmitted from the transmitter 8–61 through the incoming line circuit to a reperforator-transmitter wherein a tape is perforated in response to the signals. A director circuit associated with the reperforator-transmitter decodes the switching signals and routing information to cause a link circuit shown in Figs. 11 and 12 to establish a cross-office transmission path from the incoming line reperforator-transmitter to a second reperforator-transmitter located at the switching office and associated with a transmission path outgoing to the desired station. The signals perforated in the tape at the second reperforator are retransmitted to the desired station. Should the desired station be one of those connected to a line served by another switching center, such as the multistation line circuit designated 7–02 in Fig. 7, the message transmitted from the transmitter distributer 8–61 would be switched through two switching centers in succession and finally would be recorded at a receiving teletypewriter such as that connected at station 7–08 in Fig. 7.

GENERAL DESCRIPTION

The sending station of the present invention comprises in addition to automatic tape transmitter distributor 11 and the equipment usually associated with it, control relays F, A, B and C and key 12. Key 12 is operable to distinguish between the text and the enciphered conditions in transmitted messages. In the event that the message is to be enciphered, it is prepared with a preamble comprising the switching signals and other routing information such as the address code or codes in text, followed by a "Figures Z Letters" signal code sequence which in turn is followed by the message material. Following the enciphered material there again appears in text any further information and the "Figures H Letters" combination. The "Figures H Letters" combination is the end-of-message signal.

The switching office is identical with any of those shown in general schematic form in Figs. 3, 4, 5 and 6 or Figs. 9, 10, 11 and 12 of the Bacon et al. patent application, Serial No. 119,184.

The receiving station, shown in Fig. 2, may be one of several connected to a multistation line circuit and is associated with a station control circuit wherein a code responsive selector mechanism serves to select, in response to the address code or codes, one or more of such stations to receive a message relayed through the switching office from the sending station that originated the message. The station control circuit may be any one of those so designated in Fig. 7 or 8 of the Bacon et al. patent application, Serial No. 119,184.

In accordance with the present invention each of the receiving stations comprises a character timer circuit including vacuum tubes V1 and V2, a pulse timer circuit of the multivibrator type including vacuum tubes V3 and V4, a stepping tube V8 which may be of the type shown in M. A. Townsend Patent 2,575,370, issued November 20, 1951, a character blanking circuit comprising vacuum tubes V7 and V5, a vacuum tube signal amplifying circuit including vacuum tube V6, and typing reperforator 14 which may be of the type disclosed in R. A. Lake Patent 2,255,794, issued September 16, 1941 and shown in Fig. 109 of the Bacon et al. patent application. The code responsive selector mechanism is shown in circuit schematic form in Fig. 13 and in its structural form in Figs. 186 to 190, inclusive, of the Bacon et al. patent application, and is of the type disclosed in W. J. Zenner Patent 2,568,264, issued September 18, 1951 and G. G. Keyes Patent 2,543,174, issued February 27, 1951. This unit is equipped, for the purposes of the present invention, with a set of contacts which operate in response to the "Figures Z" signal code sequence and release in response to the "Figures H" signal code sequence. The "Figure Z" contacts when operated reduce the negative bias on vacuum tube V7 of the blanking circuit which also includes vacuum tube V5 and remain in operated condition until the end-of-message signal is received. When a message for the receiving station shown in Fig. 2 is received over line circuit 22 the cut-on character signal contacts 46 of the selector unit are operated in response to the address code assigned to this station and thereby connect the winding of receiving relay 15 to the spacing contact of the receiving relay 16 in the station control circuit. Relay 16 corresponds to a receiving relay in any one of the station control circuits, such as relay 16–01 of the station control circuit shown in Fig. 16 of the Bacon et al. patent application, Serial No. 119,184. Relay 15 is operated from the spacing contact of relay 16 on an inverse neutral basis, and repeats all signals received over the line circuit 22 from the transmitter distributor of reperforator transmitter distributor 21 at the switching office.

DETAILED DESCRIPTION OF OPERATION

*Sending station*

Figure 1:
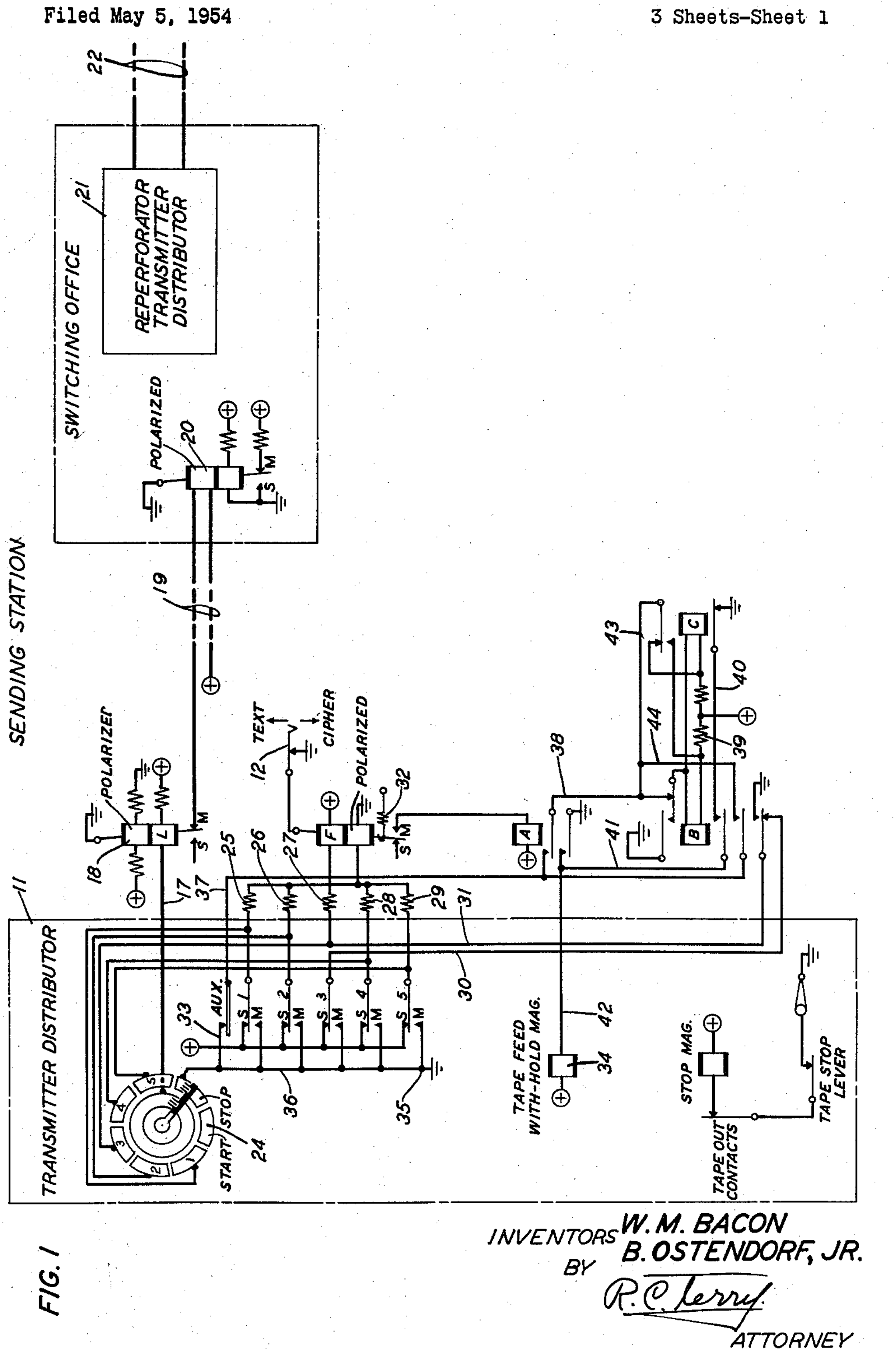
Figure 2:
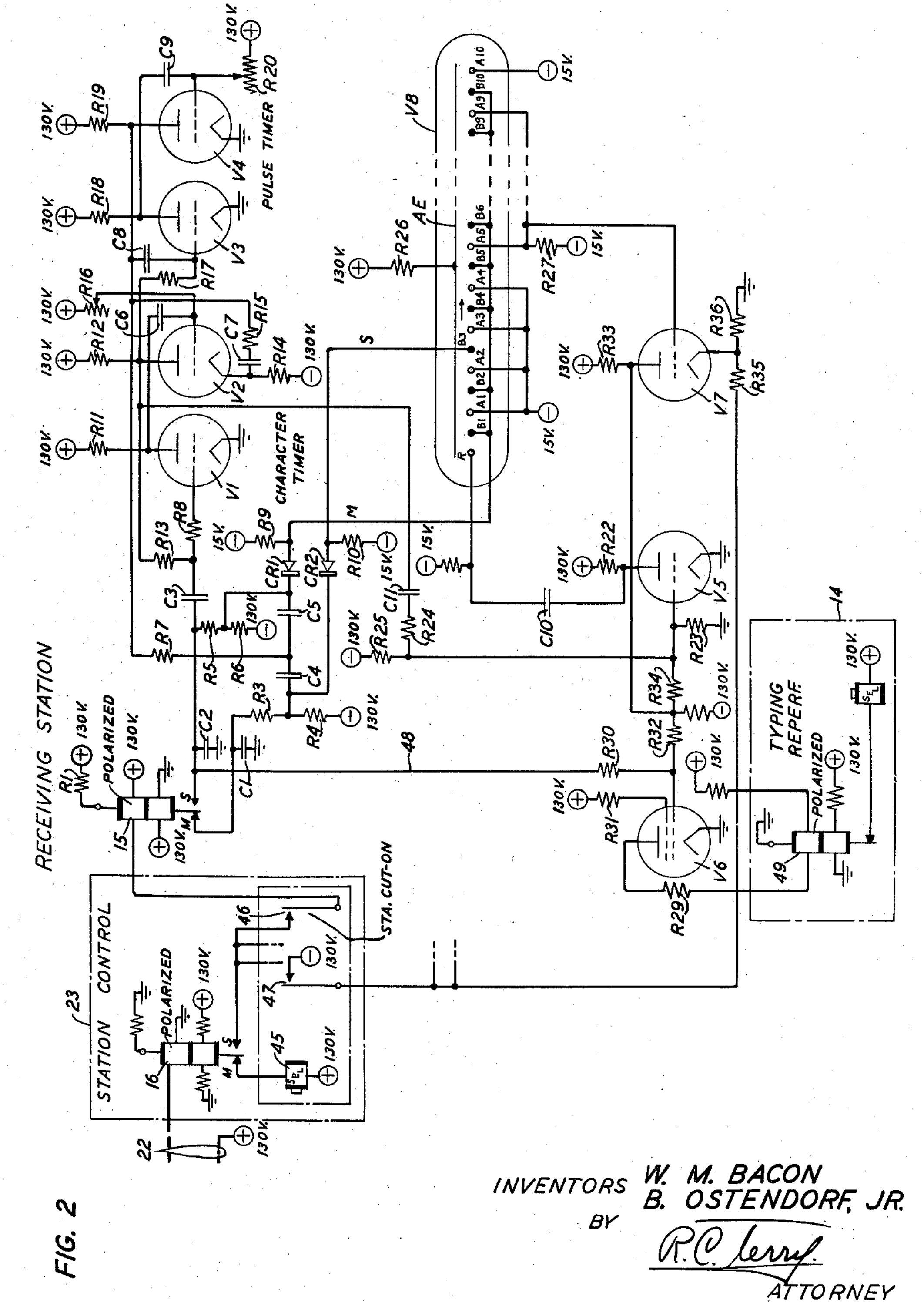

When power is first applied to the system shown in the drawings, the relays and equipment will assume the positions and conditions shown in Figs. 1 and 2. It is to be understood that suitable driving motors are provided for the various devices and that all these are started into operation by connecting them to a suitable source of power. These devices employ motors which are not shown in the drawings because it is well understood by those skilled in the art that such devices require and will be supplied with motors. Transmitter distributor 11 may be of the type disclosed in E. F. Watson Patent 2,055,567, granted September 29, 1936 and is connected to transmit to the operating winding of line relay 18 a teletypewriter message perforated in a tape. Line relay 18 repeats the signals perforated in the tape and transmitted over the face of the distributor 11 to line circuit 19 extending to the switching office at which the signals received over line circuit 19 are repeated by line relay 20 to reperforator transmitter distributor 21 such as disclosed in E. A. Gubisch Patent 2,348,214, issued May 9, 1944.

The signals are repeated by the transmitter distributor of reperforator transmitter distributor 21 over line circuit 22 to station control circuit 23 at the desired destination. The station control circuit 23 may be on the premises of one subscriber's station but serve two or more stations remotely located with respect to that one station. Then again, two or more stations may be on the same premises as the station control circuit. The code responsive selector unit is provided with contacts that are operated as a result of ultimate selections made in response to received sequences of two or more signal code combinations. By the ultimate selection is meant the operation of a selectable member in response to a signal code incoming over line circuit 22 to permit a switching or selecting function, as distinguished from the preliminary selections which have a preparing or unlocking function. The receivers, such as printers or reperforators, are connected selectively to the incoming line circuit by address codes comprising a sequence of two code combinations.

The perforated tape containing the address codes and other control codes, including the disconnect signal in plain or unenciphered condition and the body of the message in enciphered condition, is prepared in an enciphering apparatus which may be of the type shown in Patent 2,405,569 granted August 13, 1946 to K. E. Fitch and G. A. Locke.

Patent 2,405,569, the disclosure of which is incorporated herein by reference as part of the present specification, shows an enciphering circuit including a keyboard transmitter connected to a dual plug 14 which may be inserted into the jacks 17 and 18 for the generation of plain text signals and may be inserted into jacks 21 and 22 for the generation of enciphered signals. A reperforator may be connected at an appropriate point in the circuit shown in Fig. 2 of Patent 2,405,569, such as to the line conductors 23 and 24 in substitution for an outgoing line, and such reperforator will record the plain text signals and the enciphered signals generated when plug 14 is inserted in one or the other of the two sets of jacks. The tape may be most conveniently adapted to the purposes of the present invention, having regard particularly to the manual operation and restoration of key 12, if the "Figures Z" sequence of codes is followed by the number of "Letters" signals before plug 14 is transferred from jacks 17 and 18 to jacks 21 and 22 of Patent 2,405,569 for the generation of the text of the message in enciphered form. Similarly, a plurality of "Letters" signals may be generated and impressed on the tape after the enciphering of the body of the message has been completed and upon the restoration of plug 14 to jacks 17 and 18 preparatory to generation of the disconnect signal sequence "Figures H." With the extra "Letters" signals in the tape, the address portion including the "Figures Z" sequence may be detached from the portion containing the body of the message, the separation being made approximately midway through the sequence of "Letters" signals and the disconnect signal portion of the tape may be detached from the message portion in the same manner, the several fragments having by virtue of the "Letters" signals, extra portions to accommodate the fitting of the tape into the tape-sensing mechanism of transmitter-distributor 11 as will be described hereinafter.

When a message which has been prepared, as described above, is to be transmitted, the fragment of tape containing the address codes and other preliminary signals is placed in transmitter-distributor 11, and key 12 is operated to its upper or text position. Upon the starting of the distributor, the codes contained in the fragment of tape will be transmitted one after another including the "Letters" signals following the "Figures Z" sequence, and when the fragment of tape runs out of the tape-sensing mechanism the distributor will be stopped under the control of the tape stop lever in the well-known manner. The operator then places the message portion of the tape in the tape-sensing mechanism with the first character of the body of the message in registry with the tape-sensing pins, thereby preventing transmission of the "Letters" signals at the leading end of the tape fragment, which were provided merely for convenience in handling the tape and in fitting it to the tape-sensing mechanism. The operator then operates key 12 to its lower or cipher position and restarts the distributor. Preferably, the extra "Letters" signals at the trailing end of the message fragment of tape are detached before this fragment is placed in the transmitter so that they will not be transmitted, since they were produced in the plain text condition of the enciphering apparatus. When the transmission of the message portion of the tape is completed, the tape runs out and the distributor again stops. The operator then reoperates key 12 to the upper or text position and places the fragment of tape that contains the disconnect signals in the tape-sensing mechanism of transmitter-distributor 11. The "Letters" signal of the leading end of this fragment of the tape may be deleted by placing the first code combination of the disconnect signal, namely the "Figures" code combination, in registry with the tape-sensing pins. The operator again starts the distributor, the disconnect sequence of signals is transmitted, this fragment of tape runs out of the tape-sensing mechanism and the distributor again stops.

The transmission circuit of the sending circuit consists of a tape transmitter distributor arranged to send signals to the operating winding of line relay 18 which repeats the signals received from the face of the distributor 24 to the line, or upper, winding of line relay 20 at the switching office. During the text condition of the message, with key 12 being in its upper, or text, position, ground is removed from the armature of relay F and the operation of relay F has no effect on the enciphered message control circuit. During the cipher condition of the message key 12 is in its lower, or cipher, position and ground at key 12 is connected to the armature of relay F and the operation of relay F is effective to operate the control circuit comprising relays A, B and C. Normally, line relay 18 is maintained operated to its marking, or right-hand, position by current in a path extending from a grounded source of positive potential, through the lower winding of relay 18, conductor 17, brush on "stop" segment of distributor 24, conductor 36, to ground connection 35. Also, at the same time, relay F is maintained in its open, or left-hand, position by current flowing from a grounded source of positive potential, spacing contacts S on swingers Nos. 1 to 5 in parallel, resistors 25 to 29 also in parallel, through the lower winding of relay F, to ground. Swingers Nos. 1 to 5 correspond to the five sensing pins of the tape transmitter, not shown but connected to distributor 24. When the brush of transmitter distributor 24 rotates over segments Nos. 1, 2, 3, 4 and 5 during the transmission of a signal to conductor 17, the operating path for relay 18 is extended to the tape sensing contact swingers and then through the associated spacing or marking contacts to positive battery or to ground, respectively.

Relay F is a "reader" of the "Figures" signal only and in combination with the conductive paths established by the five tape sensing contact swingers Nos. 1, 2, 3, 4 and 5, the five resistors 25 to 29 respectively associated with the five swingers, will operate to its right-hand position when a "Figures" signal is sensed by the sensing pins. In response to the "Figures" signal ground is connected through the marking contacts and the swingers Nos. 1, 2, 4 and 5 in parallel, and through the respectively associated resistors 25, 26, 28 and 29, to ground through the lower winding of relay F. Positive battery is connected through the spacing contact and swinger No. 3, conductor 30, back contact and outermost lower armature of relay B, conductor 31, resistor 27, and through the upper winding of relay F, to a source of positive potential. Relay F has a biasing spring 32 on its armature, which tends to operate the relay armature to its right-hand position and will do so unless sufficient current is in either of its windings to overcome the effect of biasing spring No. 32. The resistances of resistors 25, 26, 28 and 29, inclusive, are of such values that if one or more of the swingers Nos. 1, 2, 4 and 5 effect a spacing condition sufficient current flows through the lower winding of relay F to hold the relay in its left-hand, or open, position. Resistor 27 connected in series with swinger No. 3 is of such resistance that if swinger No. 3 effects a marking condition sufficient current flows through the upper winding of relay F to hold the relay armature in its left-hand position also. If, however, swingers Nos. 1, 2, 4 and 5 effect a marking condition and swinger No. 3 effects a spacing condition no current will flow through either of the windings of relay F and the relay will operate to its right-hand, or closed, position indicating that a "Figures" signal has been sensed.

If it is assumed that key 12 is in its lower, or cipher, position, that the brushes on transmitter distributor 24 are just leaving the "stop" segment and that the nex signal to be transmitted is "Figures," this "Figures" code combination will appear on the face of transmitter distributor 24 for transmission. Relay F is operated to its left-hand position, for any code combination but "Figures" in a circuit traceable from ground, through the lower winding of the relay, then over at least one path including one of the resistors 25, 26, 28 and 29 and one of swingers Nos. 1, 2, 4 and 5 in engagement with a contact S to a grounded source of positive potential, or if none of those four swingers is engaging a spacing contact, the circuit will be traceable from battery, through the upper winding of relay F, and through break contacts of relay B and the No. 3 swinger and marking contact to ground. The swingers when operated in accordance with the selecting pulses of the signal being transmitted, remain operated until the distributor brush reaches the end of the "stop" segment.

The first, second, fourth and fifth elements of the "Figures" signal are marking and each of swingers Nos. 1, 2, 4 and 5 engages its respective marking contact M to close shunt paths around the lower winding of relay F. The third element of the "Figures" signal is spacing and its swinger No. 3 provides a shunt path around the upper winding of relay F which will operate to its right-hand, or closed, position because no current flows in either winding of relay F, there being at that time positive potential connected to both ends of the path through the upper winding of relay F and ground connected to both ends of the path through the lower winding of relay F. Relay F upon operating to its right-hand position, closes an obvious operating circuit for relay A which operates. Before the brushes of distributor 24 leave the stop segment and before the swingers have assumed positions that permit the release of the armature of relay F to its right-hand contact, normally closed auxiliary contact 33 opens. The auxiliary contact 33 remains open until the beginning of the stop pulse at the end of the "Figures" signal. Relay A prepares an operating path for relay B that is now interrupted at contact 33, and operates tape feed withhold magnet 34 to suppress the feeding of the tape at the end of the cycle then in process.

At the beginning of the stop pulse of a signal, in this case, the "Figures" signal, auxiliary contact 33 closes and thereby connects ground at connection 35 to a path extending over conductor 36, contact 33, conductor 37, contact and inner lower armature of relay A, conductor 38, normally closed make-before-break contact and winding of relay B, resistor 39, to grounded source of positive potential and relay B operates and locks operated in an obvious circuit. Relays B and C are connected in a counting circuit. Relay B, upon operating, connects a supplementary ground for tape feed withhold magnet 34, the path extending from the contact and lower armature of relay C, conductor 40, front contact and innermost lower armature of relay B, conductors 41 and 42, through the winding of magnet 34, to grounded source of positive potential. Also, relay B, upon operating, (1) connects at its middle lower armature and front contact the grounded connector 35 to the path extending over auxiliary contact 33, now closed, directly to the counting relays B and C, and (2) at its outermost lower armature (*a*) opens the path over which the No. 3 swinger codes a marking or spacing element on the No. 3 segment of distributor 24, (*b*) closes a path extending through the upper winding of relay F of the "Figures" detecting circuit, and (*c*) places a marking condition on the No. 3 segment of distributor 24. Relay F immediately operates to its open, or left-hand, position, thereby causing relay A to release but the tape feed withhold magnet 34 remains operated through the now closed path extending over the innermost lower armature and front contact of relay B, to ground at the lower armature and back contact of relay C.

Following the transmission of the "Figures" signal the brushes of transmitter distributor 24 make another revolution without stepping the tape. As the brushes leave the stop segment, auxiliary contact 33 opens to remove ground at connection 35 from the path extending over the middle lower armature and front contact of relay B, conductors 44 and 43 and upper break contact of relay C whereby this path, a shunt around relay C, is opened and relay C of the counting relay circuit operates. Relay C, upon operating, locks through the upper armature and front contact of relay B and removes at its lower armature and back contact the supplementary ground which held tape feed withhold magnet 34 operated after relay A released. Therefore, at the end of the cycle of the signal now being transmitted, the transmitter of transmitter distributor 24 will no longer withhold tape feeding and the tape feeding mechanism will operate. Both relays B and C are now operated and the brushes of distributor 24 transmit a "Letters" signal, the "Letters" signal being five mark elements successively transmitted over circuit 17 which extends through the lower winding of relay 18, to a grounded source of positive potential. The first, second, fourth and fifth mark elements are transmitted over paths respectively extending from ground connection 35 through swingers Nos. 1, 2, 4 and 5 and their respective segments of distributor 24, the rotating brush and solid ring of the distributor, conductor 17, through the lower winding of relay 18, to the source of grounded positive potential. The third mark element is transmitted over a path which extends to ground at the front contact and outermost lower armature of relay B. These two paths when closed by the rotating brush permit the automatic transmission of the "Letters" signal immediately following the transmission of "Figures" signal transmitted from the perforated tape.

At the end of this "Letters" signal the auxiliary contact 33 closes again to close a shunt path around the locking circuit for relay B, the shunt path extending from grounded source of positive potential, resistor 39, front contact and upper armature of relay C, conductors 43 and 44, front contact and middle lower armature of relay B, conductor 37, auxiliary contact 33, conductor 36, to grounded connection 35. Relay B releases and at its outermost lower armature and back contact reestablishes the normal connection for the No. 3 swinger. Also relay B, upon releasing, removes ground at its upper armature and front contact to thereby open the operating circuit for relay C which now releases. The transmission of signals following the "Figures" signal in the tape continues until another "Figures" signal is sensed, when the cycle of automatically generating and transmitting a "Letters" signal is repeated.

*Receiving station*

The switching character signals and other routing information, which effect the selection of reperforator-transmitter 21 at the switching center, are transmitted over line circuit 22 and direct the establishment of the connection, through the code responsive selector unit of the station control circuit with which the desired receiving station is associated, to that station. Line relay 16 of the station control circuit repeats all signals incoming over line circuit 22 to selector magnet 45 of the code responsive selector unit. In response to the routing information incoming over line circuit 22, cut-on contact 46 closes under the control of the address code for the desired receiving station and thereby prepares a connection to repeating relay 15 at the desired receiving station.

The code responsive selector unit is equipped with an extra contact 47 which closes in response to the "Figures Z" signal combination incoming immediately after the routing information and opens in response to the "Figures H" signal combination as part of the end-of-message code combination incoming after the message. The "Figures Z" contact 47, upon operating, connects a source of grounded negative potential to the cathode of vacuum tube V7 to prepare the circuit for producing a blanking voltage necessary to delete the "Letters" signal when such signal follows immediately after the "Figures" signal in the body of an incoming message. Repeating relay 15 repeats all signals received over line circuit 22 from the switching office and repeated by line relay 16.

Other receiving stations may be selected by their respective cut-on contacts as indicated by the additional connections to the space, or right-hand, contact of relay 16 and by their connections established at contact 46 to their respective receiving relays corresponding to relay 15.

Figure 3:
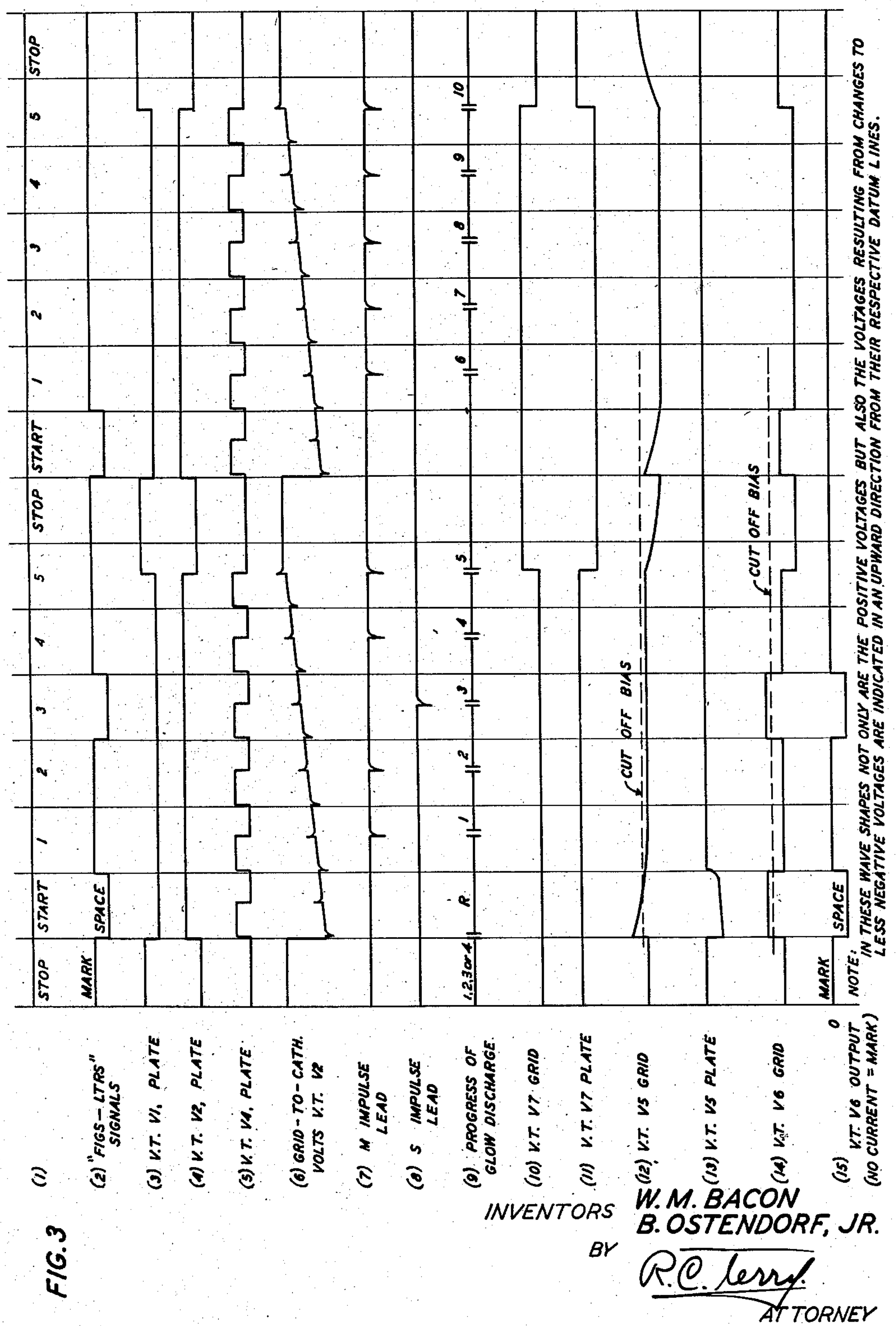

It might be well in describing the operation of the receiving station circuit shown in Fig. 2, particularly, in response to an enciphered message, to refer to the wave shapes shown in Fig. 3 and representing the voltages produced at various points in the receiving station circuit by the incoming "Figures Letters" code combination transmitted each time the "Figures" code combination occurs in the message. Referring to Fig. 3, there are shown fifteen wave shapes representing the voltages occurring at the significant points in the receiving station circuit. In these wave shapes not only the positive voltages but also the voltages resulting from changes to less negative voltages, are indicated in an upward direction from their respective datum lines. When the incoming message is in plain text the wave shapes Nos. 14 and 15 only are of interest.

Wave shape No. 1 merely indicates the elements and the duration of each of any two consecutively received five unit start-stop signals repeated by relay 15, each signal starting from a "stop" condition. Wave shape No. 2 shows the elements of a "Figures" and a "Letters" signal, the "Letters" signal being received immediately following the "Figures" signal. The selecting elements of the "Figures" signal are shown to be mark, mark, space, mark and mark, and those of the "Letters" signal are all marks and in this order these elements appear at the contacts and armature of relay 15.

Signal elements repeated at the "mark" contact M of relay 15 are similar to the mark signals shown in wave shape No. 2. In general, a pulse of positive voltage is shown extending above the line of zero voltage of a wave shape. However, the signal pulses repeated at "space" contact S of relay 15, since they are of the same polarity as those repeated at contact M, are herein assumed to be at a zero, or less, voltage with respect to the positive voltage of the mark pulses in a wave shape. These space pulses are applied through condenser C3 and resistor R8 to the grid of vacuum tube V1. The time constant of condenser C3 and resistor R8 connected thereto is of short duration so that the space pulses repeated by relay 15 are reduced to sharp impulses of relatively short duration. A mark-to-space transition in the repeated signals causes a positive voltage to be impressed on the grid of vacuum tube V1, which being normally non-conducting, becomes conducting. Vacuum tube V1 is normally non-conducting because vacuum tube V2 is normally conducting in that its grid is connected to a source of positive potential through resistor R16. The conduction of vacuum tube V2 when the character timer circuit is in idle condition causes the plate of the tube to go toward negative and the grid of vacuum tube V1, which is connected in a path extending through resistor R13 to the plate of vacuum tube V2, also goes toward negative to normally maintain vacuum tube V1 in a non-conducting condition. When vacuum tube V1 conducts, as in response to the start element of a code combination, its plate voltage goes towards negative and this negative voltage is impressed through condenser C6, on to the grid of vacuum tube V2 to change vacuum tube V2 to a non-conducting condition. While vacuum tube V2 is in a non-conducting condition, the source of positive potential connected to resistor R12 is impressed through resistor R13 onto the grid of vacuum tube V1 to hold vacuum tube V1 conducting for a period of time determined by the time constant of condenser C6 and resistor R16. This period of time is adjusted in the present arrangement to be equal to the duration of 5½ elements of a start-stop five-unit teletypewriter signal. Therefore, the circuits of vacuum tubes V1 and V2 serve as a character timer of incoming signals and the plate voltages of vacuum tubes V1 and V2 during this character timing interval are shown by wave shapes Nos. 3 and 4, respectively. Mark-to-space transitions for the selecting elements of the code combination also cause positive pulses to be applied through condenser C3 to the grid of tube V1, but since the tube has been rendered conductive by the mark-to-space transition of the start element, no change in the effective condition of tube V1 results from the additional pulses.

Vacuum tubes V3 and V4 are connected as a multivibrator oscillator and operate herein as a pulse timer. The period of the half cycle, during which either of these tubes is in a non-conducting condition, is determined by the time constant of the condenser and resistor connected to its grid. Oscillation is prevented when the voltage applied through resistor R17 is more negative than the cut-off voltage of vacuum tube V3. This voltage applied through resistor R17 is obtained from the plate of vacuum tube V2 so that oscillation of the pulse timer circuit is prevented during non-operating, or idle, periods of the character timer circuit. The relationships between the character timing voltages and the pulse timing voltages are shown in wave shapes Nos. 4 and 5. A series of short, sharp pips, or impulses of very short duration, are derived from the pulse timer circuit and are fed through resistor R15 and condenser C7 to the cathode of vacuum tube V2. These impulses cause the character timer circuit to time out at the exact end of one of the pulse timing intervals as shown in wave shape No. 6.

Impulses from the pulse timer circuit are also derived by condensers C4 and C5 and are applied to the biased diodes CR1 and CR2. These diodes are cut off by voltages from the contacts of receiving relay 15. The diode which is receiving a positive potential from its corresponding contact on relay 15 is cut off and thereby prevents an impulse transmitted from the pulse timer circuit received through resistor R7 to condenser C4 or C5 from going through diode CR2 or CR1.

The positive terminal of each diode is connected to a conductor, thus marking impulses appear on conductor S and spacing impulses appear on conductor M, all being of negative polarity. Of the signals incoming over line circuit 22 the marking impulses are repeated over the marking contact of each of relays 16 and 15, in turn, to bus bar S and the spacing impulses are repeated over the spacing contacts of the two relays to conductor M. Typing reperforator 14 is connected through amplifier tube V6 to repeating relay 15 on the basis of inverse neutral transmission wherein current flows during spacing elements only. Occurrence of impulses on the two conductors M and S when the incoming combination is "Figures Letters" is shown on wave shapes Nos. 7 and 8.

Stepping tube V8 is a cold cathode gas discharge tube designed for continuous counting or registration of pulses. It comprises a reset cathode, ten stages of two cathodes each, and anode AE which is common to all the cathodes. Structurally, the cathodes and the anode are arranged in concentric arrays, or rings, with the free end of each cathode in close proximity to the anode. Only one cathode-anode gap is broken down at a time and the glow discharge progresses from one cathode to the next under the control of the impulses of the marking and spacing elements received from conductors M and S, respectively, and shown in wave shapes Nos. 7 and 8, respectively. Each stage consists of an input cathode B followed by an output cathode A. Cathodes B1, B2, B4 and B5 are connected to conductor M and cathode B3 is connected to conductor S, and these cathodes are arranged to receive the impulses of negative polarity derived from the selecting pulses of an incoming "Figures" signal. Cathodes B6, B7, B8, B9 and B10 are connected to conductor M and are arranged to receive the impulses of negative polarity derived from the selecting pulses of the incoming "Letters" signal. No other combination of two character signals is capable of causing a glow discharge to reach cathode B10. The reset cathode R is normally biased to a slightly negative potential from a source, say of 15 volts, and is positioned between cathodes B1 and A10 which in their respective concentric rings are in close proximity to each other. The reset cathode R has impressed on itself a relatively high negative polarity at the time when vacuum tube V2 becomes non-conducting in response to the start pulse of an incoming signal. The start pulse causes vacuum tube V2 which is normally conducting, to become non-conducting and thereby impresses a voltage of positive polarity on the circuit including condenser 11, resistor R24 and the grid of vacuum tube V5. Therefore, vacuum tube V5 conducts to apply a negative pulse to reset electrode R at the beginning of an incoming signal, whereby a glow discharge occurs between electrode R and anode AE to condition stepping tube V8 for the reception of the selecting elements of the incoming signal. This voltage of positive polarity impressed on the circuit of condenser 11, is shown in wave shape No. 12 and the resultant voltage on the plate of vacuum tube V5 is shown in wave shape No. 13. It will be noted in wave shape No. 12 that the positive voltage on the grid of vacuum tube V5 during the "start" element of "Figures" signal is of short duration and therefore the interval during which vacuum tube V5 conducts is only a little more than one half of the duration of the "start" element. The grid voltage of vacuum tube V5 returns to and remains at zero or a slightly negative voltage of a value slightly less than the cut-off voltage of the tube for the duration of 5½ elements of the "Figures" signal as predetermined by the character timer circuit. About the middle of the fifth selecting element of the "Figures" signal the character timer circuit returns to its normal condition and the grid voltage of vacuum tube V5 becomes more negative so that in response to the "start" element of the immediately succeeding incoming signal when the grid voltage of vacuum tube V5 will go toward positive polarity it will not go sufficiently toward positive to cause the tube V5 to conduct.

The grid voltage at vacuum tube V5 is prevented from becoming sufficiently positive at this time by a "blanking" voltage at the plate of vacuum tube V7 as hereinafter described. During the 5½ elements succeeding the "start" pulse of the immediately succeeding incoming signal when the character timer circuit is timing-out the character signal the grid voltage of vacuum tube V5 again becomes negative with respect to its cathode voltage.

With respect to the transfer of glow discharge from cathode to cathode in stepping tube V8 in response to the selecting pulses of an incoming signal, the direction of transfer is indicated by the arrow shown in tube V8. The selecting pulses, in turn, are applied to their respective cathodes of cathodes B1 to B5 of the first five stages. Should two certain signals be consecutively received from the line circuit, the ten selecting impulses of these two signals would cause a negative potential to be applied, in turn, to their respective cathodes B1 to B10 of the ten stages. In other words, the glow discharge is transferred from a B cathode to its associated A cathode in one stage at the time when a selecting pulse of a signal is received and then from the next succeeding B cathode to its A cathode in the next stage at the time that the next succeeding selecting pulse is received.

When a "Figures" signal, such as mark, mark, space, mark and mark, the first of the above-mentioned two certain signals, is received in the enciphered text or body of the message the first incoming mark pulse received from the mark, or left-hand, contact of repeating relay 15, assuming that the glow discharge of the stepping tube V8 is at this time at reset cathode R, causes the glow discharge to be transferred to cathode B1, which is the nearest to reset cathode R and upon cessation of the first pulse the glow discharge is transferred to the next succeeding cathode A1. In response to the next succeeding, or second, pulse which is a "mark" received again from the mark contact of relay 15, the glow discharge transfers first to cathode B2 and then upon cessation of the second pulse, to cathode A2. In response to the third pulse which is "space" received from the space, or right-hand, contact of relay 15, the glow discharge transfers first to cathode B3 and then upon cessation of the third pulse to cathode A3. Accordingly, in response to the fourth and fifth pulses both of which are "marks" the glow discharge transfers, in turn, to cathodes B4, A4, B5 and A5. Since the incoming code signal following the "Figures" in the enciphered message is the "Letters" signal, which was automatically inserted at the sending station as hereinbefore described, the next five succeeding pulses which are all "marks," cause the discharge to be successively transferred from one to another of cathodes B6, A6, B7, A7, B8, A8, B9, A9, B10 and A10; no other succession of pulses would cause the glow discharge to step to cathode A10. The appearance of the glow in stepping tube V8 is shown in wave shape No. 9.

The grid of vacuum tube V7 is connected to cathodes A5, A6, A7, A8 and A9 of tube V8. When the glow discharge is on any of these cathodes a small positive voltage exists across resistor R27 and this positive voltage shown in wave shape No. 10 causes vacuum tube V7 to conduct, the resulting plate current changing the plate voltage to a negative value shown in wave shape No. 11. This plate voltage serves as a "blanking" voltage in that it does not permit the "Letters" signal to be recorded at the typing reperforator 14. When such signal immediately follows the "Figures" signal in the enciphered message, the plate voltage of vacuum tube V7, when conducting, holds the grid of amplifier vacuum tube V6 in marking condition whereby vacuum tube V6 remains non-conducting so that the "Letters" signal will not be recorded at typing reperforator 14. This plate voltage at vacuum tube V7 prevents a resetting pulse from being applied by vacuum tube V5 to reset cathode R, through condenser C10 by reducing the grid voltage applied to the grid of vacuum tube V5, as shown in wave shape No. 12 during the signal pulse interval corresponding to the "stop" pulse of the "Figures" signal.

Voltage is applied by the character timer circuit through condenser C11 as hereinbefore stated, to the grid of vacuum tube V5. This transient voltage occurs at the beginning of every received code signal. However, it causes vacuum tube V5 to generate a resetting voltage as shown in wave shape No. 13 only if there is no "blanking" voltage. The net effect on stepping tube V8 is that a resetting voltage is applied to reset cathode R at the beginning of every incoming signal unless the immediately preceding signal is "Figures" which caused the glow discharge in stepping tube V8 to reach cathode A5. Only a "Figures" signal incoming at receive relay 15 can cause the glow discharge to proceed as far as cathode A5 and when this occurs, the signal immediately following will not permit an initial resetting pulse to be applied to reset cathode R. Since it is predetermined herein that the signal following any "Figures" signal in the enciphered text or body of a message will always be a "Letters" signal, stepping tube V8 is shown wired so that the pulses repeated in response to the "Letters" signal will step the glow discharge along to cathode A9 and cause a "blanking" voltage to be produced at vacuum tube V7. When the glow discharge reaches cathode A10 the "blanking" voltage is removed and any immediately succeeding signal upon being repeated by relay 15 will cause stepping tube V8 to be reset.

The spacing pulses of incoming signals repeated by repeating relay 15 are applied to a path extending over conductor 48, resistor R30, to the grid of amplifier vacuum tube V6. Also, the "blanking" voltage of vacuum tube V7 is applied to the grid of amplifier tube V6. When the "blanking" voltage is negative, as when vacuum tube V7 is conducting, amplifier tube V6 cannot conduct. When the "blanking" voltage is removed, that is, becomes positive, as when vacuum tube V7 is not conducting, vacuum tube V6 will conduct to supply current in response to a spacing pulse of a signal repeated by relay 15. These plate current voltages corresponding to the space voltage of the incoming signal operate line relay 49 of the typing reperforator 14 to record the incoming signals.

All incoming signals except the "Letters" signal immediately following a "Figures" signal in an enciphered message, are recorded as an enciphered message. The type of transmission used by typing reperforator 14 is frequently called "inverse neutral" as described above.

The "blanking" circuit is disabled by removing from the cathode of vacuum tube V7 the source of negative potential connected to contact 47 in the code responsive selector unit. Contact 47 is open in response to a "Figures H" signal code combination, the end-of-message signal, which is transmitted immediately following the operation of key 12 at the sending station to its text, or upper, position. Vacuum tube V7 cannot conduct to generate a "blanking" voltage unless the transmission line circuit is in condition to transmit enciphered messages.

What is claimed is:

1. In a telegraph system, a channel for transmitting teletypewriter signals, a receiving station connected to said channel, said receiving station comprising a message recorder, electromagnetic means for repeating said signals incoming from said channel to said recorder, a station control circuit for directing a message incoming from said channel to said recorder, a character timer circuit for timing the duration of each teletypewriter signal of the message incoming over said channel, a character element timer circuit for timing the duration of each unit interval of the selecting elements of each of the signals of said incoming message, a gaseous discharge tube having a reset cathode normally biased to a slightly negative potential, a row of voltage input cathodes corresponding in number to the selecting pulses of two teletypewriter signals, a row of voltage output cathodes each positioned in proximity to one of said input cathodes and an anode opposite said cathodes, and means in said character timer circuit for producing a voltage at the beginning of each signal incoming from said channel for causing a relatively high negative potential to be applied to said reset cathode whereby a discharge between said reset cathode and said anode is initiated, means responsive to the selecting elements, in turn, of two certain signals incoming from said channel for advancing said discharge between said anode and said reset cathode to the first of said input cathodes and then to the first of said output cathodes, and then to each input cathode and its respective output cathode, in turn, until the discharge reaches the last of said output cathodes, means responsive to the voltage produced at the beginning of any signal other than the second signal of said certain signals for restoring the discharge occurring at the time at any of the said input or said output cathodes to said reset cathode for conditioning said gaseous discharge tube for response to the selecting elements of said signal, a space discharge tube responsive to the discharge produced at the output cathodes in response to the last one of the selecting elements of the first of said certain signals, and the selecting pulses of the second of said certain signals for producing a "blanking" voltage, space discharge means responsive to said "blanking" voltage and said voltage produced at the beginning of each signal by said means in the character timer circuit, and the pulse voltages repeated by said electromagnetic means, simultaneously, to prevent (1) said reset cathode from initiating a discharge to said anode at the beginning of the second of said certain signals and (2) said recorder from recording the second of said certain signals.

2. In a telegraph system, a channel, a receiving station connected to said channel, said receiving station comprising a printer, a station control circuit for directing teletypewriter messages incoming from said channel, a character timer circuit for timing the duration of each teletypewriter signal of a message incoming over said channel, a signal element timer circuit for timing the duration of unit intervals of the selecting elements of each of the message signals, a gaseous discharge tube having a reset cathode normally biased to a slightly negative voltage, a row of cathodes corresponding in number to the selecting pulses of two teletypewriter signals, a second row of cathodes for receiving a discharge from their respectively associated electrodes of the first-mentioned row, and an anode opposite said cathodes, electromagnetic means responsive to the first element of each message signal received from said channel for initiating the operation of said character timer circuit, means in said signal element timer circuit responsive to the operation of said character timer circuit, means in said character timer circuit for producing a voltage at the beginning of each message signal incoming from said channel for causing a relatively high negative voltage to be applied to said reset cathode whereby a glow discharge to said anode is initiated, means in said tube responsive to the first selecting element of a "Figures" signal in said message incoming from said channel for advancing the glow discharge at said reset cathode to said first cathode in said first-mentioned row, other means in said tube responsive to the remainder of the selecting elements of said "Figures" signal and all the selecting elements of a "Letters" signal immediately following said "Figures" signal for advancing the glow discharge from cathode to cathode, to the last cathode in said second row, a space discharge tube responsive to the glow discharge caused by the elements of said "Letters" signal in addition to the glow discharge caused by one element only of said "Figures" signal, and space discharge means responsive to the operation of said space discharge tube for preventing the application of the negative potential of relatively high value to said reset cathode at the beginning of said "Letters" signal and for preventing the operation of said printer in response to said "Letters" signal.

3. In a telegraph system, a sending station, a receiving station, a channel interconnecting said stations, said sending station comprising a teletypewriter adapted to transmit under the control of a message tape transmitter and tape feeding mechanism therefor, tape feeding withholding means for said transmitter, operable means positionable accordingly as a message is to be transmitted in plain text or cipher, a control circuit conditionable by said operable means to be responsive to a certain switching function teletypewriter signal transmitted from said transmitter to said channel for automatically transmitting immediately thereafter another certain switching function signal means in said control circuit and operative in response to the first-mentioned certain signal for operating said withholding means to prevent the operation of said tape feeding mechanism during the transmission of said other certain signal to said channel, said receiving station comprising a message recorder, a station control circuit for directing a message incoming from said channel to said recorder, a signal timer circuit for timing the duration of each of the signals in said message, a signal element timer circuit for timing the duration of the unit intervals of the selecting elements of each of said signals, a gaseous discharge tube having a reset cathode normally biased to a slightly negative potential, a row of cathodes corresponding in number to the selecting elements of said certain signal and said other signal incoming over said channel, a second row of cathodes respectively associated with the cathodes of the first-mentioned row, and an anode opposite said cathodes, means responsive to the start element of the first-mentioned certain signal for initiating a glow discharge between said reset cathode and said anode, means for stepping the glow discharge from cathode to cathode of both of said rows to the last cathode in said second row in response to the selecting pulses of said certain and said other signal only, a space discharge device responsive to the discharge produced by any of the selecting pulses of said other signal in addition to the discharge produced by the last element of said certain signal for transmitting a "blanking" voltage to prevent the application of a relatively high negative voltage at said reset cathode whereby no discharge to said anode is initated at the beginning of said other certain signal and to prevent said other certain signal from being recorded at said recorder.

4. In a telegraph system for transmitting enciphered messages, a transmitter adapted to transmit under control of a perforated tape, a recorder having a telegraph signal receiver therein, a channel of transmission interconnecting said transmitter and said recorder, signal combination sensing means and signal combination generating means, responsive to said sensing means associated with said transmitter for automatically causing the transmission of a signal sequence differing only from the signal sequence in the tape by the insertion of a particular signal after each occurrence of a particular other signal, and space discharge counting tube means associated with said recorder for precluding response of the recorder to said inserted signal, said space discharge counting tube means comprising first space discharge means for timing an interval approximating the duration of a teletypewriter character, second space discharge means responsive to said first space discharge means for timing an interval equal in duration to that of a single signal element in said character, and third space discharge means, jointly responsive to said second space discharge means and to said signal receiver, for identifying the signal elements of said other signal and of said particular signal.

5. In a telegraph system for transmitting enciphered messages, a transmitter adapted to transmit under control of a perforated tape, a recorder, a channel of transmission interconnecting said transmitter and said recorder, signal combination sensing means and signal combination generating means, responsive to said sensing means associated with said transmitter for automatically causing the transmission of a signal sequence differing only from the signal sequence in the tape by the insertion after each occurrence of a particular signal, of a different signal having the opposite functional significance of said particular signal, space discharge counting tube means associated with said recorder, said counting tube means selectively responsive to the reception of said particular signal and of said inserted signal immediately following said particular signal, to produce a blanking potential condition while said inserted signal is being received and other space discharge tube means responsive to said condition for precluding response of the recorder to said inserted signal.

6. In a telegraph system for transmitting enciphered messages, a transmitter adapted to transmit under control of a perforated tape, a recorder, a channel of transmission interconnecting said transmitter and said recorder, signal combination sensing means and signal combination generating means, responsive to said sensing means associated with said transmitter for automatically causing the transmission of a signal sequence differing only from the signal sequence in the tape by the insertion of a "Letters" signal after each occurrence of a "Figures" signal, and space discharge signal combination blanking means associated with said recorder for precluding response of the recorder to said inserted "Letters" signal, said space discharge blanking means comprising a space discharge stepping circuit responsive to the sequential reception of said "Figures" and said "Letters" signals and another space discharge device responsive to said stepping circuit.

7. In a teletypewriter message transmission system, a transmitting station, signal combination sensing means, signal combination generating means, responsive to said sensing means, and other means at said station for invariably generating and transmitting a first predetermined signal code combination immediately following each occurrence of a second predetermined signal code combination, a receiving station including a recorder, a space discharge stepping tube at said receiving station controllable by received signal code combinations said tube having an array of gaps including a starting gap and a plurality of counting gaps, each of said gaps energizable in sequence, diode gate control means connected to said stepping tube and adapted to energize a particular gap in a more advanced position in said sequence with respect to said starting gap in response to said second predetermined signal code combination alone than in response to any other single signal code combination, and space discharge signal combination blanking means controlled by said stepping tube as it responds to said first predetermined signal code combination, after reaching said particular gap and while being stepped to another gap in yet another more advanced position, for estopping response of said recorder to said first predetermined signal code combination.

8. In a teletypewriter message transmission system, a transmitting station, signal combination sensing means, signal combination generating means, responsive to said sensing means and other means at said station for invariably generating and transmitting a first predetermined signal code combination immediately following each occurrence of a second predetermined signal code combination, a receiving station, space discharge stepping means at said receiving station controllable by received signal code combinations and adapted to be stepped to a more advanced position in response to said second predetermined signal code combination alone than in response to any other single signal code combination, and recycling means for said stepping means operable at the beginning of each signal code combination following failure of said stepping means to reach said more advanced position, said recycling means comprising a space discharge character timer, a space discharge starting potential control tube for said stepping means, responsive to said timer, and a starting electrode in said stepping means responsive to said starting control tube.

9. In a teletypewriter message transmission system, a transmitting station, signal combination sensing means, signal combination generating means, responsive to said sensing means and other means at said station for invariably generating and transmitting a first predetermined signal code combination immediately following each occurrence of a second predetermined signal code combination, a receiving station, space discharge stepping means at said receiving station controlled by received signal code combinations and adapted to be stepped to a more advanced position in response to said second predetermined signal code combination alone than in response to any other single signal code combination, recycling means for said stepping means normally operable in response to the beginning of each signal code combination, said recycling means comprising a space discharge character timer responsive to the reception of the first signal element of a combination, a space discharge start control tube for said stepping means, responsive to said timer and a recycling cathode in said stepping means responsive to said control tube, and space discharge signal combination blanking means controlled by said stepping means upon reaching said more advanced position for precluding operation of said recycling means in response to the beginning of the next received signal code combination.

10. In a teletypewriter message transmission system, a transmitting station, signal combination sensing means, signal combination generating means, responsive to said sensing means and other means at said station for invariably generating and transmitting a first predetermined signal code combination immediately following each occurrence of a second predetermined signal code combination, a receiving station, stepping means at said receiving station comprising a plurality of space discharge gaps energizable in succession by received signal code combinations means for stepping said discharge, to a more advanced gap in said succession in response to said second predetermined signal code combination than in response to any other signal code combination, and discharge transferring means responsive to the beginning of any signal code combination following one that fails to cause the stepping of said discharge to said more advanced gap for recycling said stepping means to its initial condition.

11. In a teletypewriter message transmission system, a transmitting station, signal combination sensing means, signal combination generating means, responsive to said sensing means and other means at said station for invariably generating and transmitting a first predetermined signal code combination immediately following each occurrence of a second predetermined signal code combination, a receiving station, stepping means at said receiving station comprising a plurality of space discharge gaps energizable in succession by received signal code combinations, means for stepping said discharge to a more advanced gap in said succession in response to said second predetermined signal code combination alone than in response to any other single signal code combination, discharge transferring means normally responsive to the beginning of any signal code combination for recycling said stepping means to its initial condition, said transferring means comprising a space discharge character timer and a starting element in said tube responsive to said timer, and means responsive to the energization of further gaps beyond said advanced gap for precluding operation of said recycling means during reception of the signal code combination causing energization of said further gaps.

12. In a teletypewriter message transmission system, a transmitting station, signal combination sensing means, signal generating means, responsive to said sensing means and other means at said station for invariably generating and transmitting a first predetermined signal code combination immediately following each occurrence of a second predetermined signal code combination, a receiving station including a recorder, a space discharge counting tube having a plurality of discharge gaps energizable in sequence, means responsive to received signal code combinations for advancing a discharge from gap to gap from a predetermined starting gap means for stepping said discharge to a more advanced gap in response to said second predetermined signal code combination alone than in response to any other single signal code combination, and means associated with gaps beyond said more advanced gap for precluding response of said recorder to said first predetermined signal code combination, said last means comprising another space dischage tube responsive to the energization of said gaps beyond said more advanced gap and means responsive to said other tube for controlling said starting gap.

References Cited in the file of this patent

UNITED STATES PATENTS

| | | |
|---|---|---|
| 1,416,765 | Vernam | May 23, 1922 |
| 2,406,023 | Locke | Aug. 20, 1946 |
| 2,406,829 | Haglund et al. | Sept. 3, 1946 |